United States Patent [19]

Medves

[11] 4,203,957

[45] May 20, 1980

[54] MODIFIED PHOSPHORUS FURNACE OPERATION

[75] Inventor: James S. Medves, St. Johns, Canada

[73] Assignee: ERCO Industries Limited, Islington, Canada

[21] Appl. No.: 879,111

[22] Filed: Feb. 21, 1978

[30] Foreign Application Priority Data

Dec. 23, 1977 [CA] Canada .................................. 293866

[51] Int. Cl.$^2$ ............................................. C01B 25/01
[52] U.S. Cl. .................................................... 423/323
[58] Field of Search ...................... 423/318, 322, 323

[56] References Cited

U.S. PATENT DOCUMENTS

| | | | |
|---|---|---|---|
| 862,092 | 7/1907 | Morehead | 423/322 |
| 1,875,755 | 9/1932 | Noyes | 423/322 |

OTHER PUBLICATIONS

Van Wazer, Phosphorus and its Compounds, 1961, pp. 1197 & 1201.

Primary Examiner—O. R. Vertiz
Assistant Examiner—Thomas W. Roy
Attorney, Agent, or Firm—Sim & McBurney

[57] ABSTRACT

A more efficient and economical phosphorus furnace process with much improved and safer working conditions is described. The process is carried out without an electrostatic precipitator, while ensuring that the furnace exit gases are at consistently low temperatures, and at a slight positive pressure in the duct from the furnace to the precipitator and that partial condensation of phosphorus prior to the condensers takes place substantially dry.

4 Claims, No Drawings

MODIFIED PHOSPHORUS FURNACE OPERATION

FIELD OF INVENTION

The present invention relates to the operation of electric furnaces of the continuous electric arc type used for the manufacture of phosphorus by the thermal method. More particularly, the invention relates to an improved method of handling the gaseous products of such electric furnaces.

BACKGROUND OF THE INVENTION

In the typical operation of electrothermal phosphorus furnaces, the gaseous products, consisting mainly of phosphorus vapour, carbon monoxide gas and entrained amounts of dust made up of fine particles of the raw material burden of the furnace, are removed from the top of the furnace, and are passed through an electrostatic precipitator kept at a temperature above the dew point of the phosphorus to remove the dust from the gaseous products stream. The phosphorus vapour and carbon monoxide gas leaving the precipitator, desirably free of particulates, is forwarded to a series of water spray condensers, wherein the phosphorus vapour is liquified and collected in sumps under the condensers. The remaining carbon monoxide gas is usually burned in a flambeau.

Efficient functioning of the electrostatic precipitator is highly desirable since any dust which is not removed from the gaseous products stream therein accumulates in the condenser sumps, causing the formation of an undesirable phosphorus-water-solid particulate emulsion, commonly known as mud. In actual practice, the precipitators are not efficient in dust removal and phosphorus mud formation occurs. Typical analysis of the mud is about 30% by weight phosphorus, about 55% by weight water and about 15% by weight solids. Since the recovery of phosphorus from mud is difficult and expensive, the formation of mud in the phosphorus furnace process constitutes a nuisance, representing considerable handling and disposal problems and often an economic loss of phosphorus values.

The size and construction of the electrostatic precipitators is such that the development of leaks in the body of the precipitator is practically impossible to avoid during operation. For this reason the precipitator is typically operated under vacuum so that gases do not enter the outside atmosphere around the unit and cause hazardous working conditions. However, operation under vacuum results in the ingress of some air into the body of the precipitator, causing combustion of some of the phosphorus vapour and consequently the formation of phosphoric acid and also some amorphous phosphorus. These materials, when mixed with dust withdrawn from the precipitator, introduce additional handling difficulties with respect to the precipitator dust and represent a loss of phosphorus. Some of the acid formed in this manner passes with the gaseous products stream to the condensers, ending up in the condenser sumps, and has to be neutralized there with an alkali, such as, ammonia or sodium hydroxide.

Since the temperature inside the precipitator has to be maintained above the dew point of phosphorus in order to avoid condensation of liquid phosphorus inside the unit, the gases leaving the furnace are typically kept at temperatures in excess of 300° C., up to, typically, about 450° C. Such high temperature operation is deleterious to the equipment and contributes to process control difficulties. When, from time to time, due to temperature fluctuations caused by erratic control, there occurs condensation of phosphorus inside the precipitator, the condensed phosphorus in the dust withdrawn from the unit will fire up and burn, causing very difficult working conditions and further loss of phosphorus.

Thus, the handling of the gaseous products of phosphorus furnaces using electrostatic precipitators, as practised by the prior art, presents numerous problems and is not generally satisfactory. While precipitators are considered an essential part of the furnace gas handling system to minimize mud formation, they are notoriously inefficient, difficult to control and are one of the major contributors to poor working conditions in phosphorus furnace plants. The capital cost of precipitators is very high and the cost of their maintenance is considerable.

There have been various attempts in the past to bypass the electrostatic precipitators by connecting the furnace gas off-take directly to the condensers. These attempts have, however, generally resulted in a considerably increased generation of mud which has been considered unacceptable, in view of the problems associated with phosphorus recovery from the mud, as discussed above.

SUMMARY OF THE INVENTION

The present invention is directed to an improved phosphorus-producing process wherein the prior art electrostatic precipitator is eliminated and yet the problems associated with prior attempts to eliminate the precipitator are not encountered.

It has been found that, by controlling certain parameters of the process, the elimination of the electrostatic precipitators does not lead to the expected increased mud formation but rather results in decreased mud formation along with decreased phosphorus loss to the effluent water from the condenser sumps. The procedure of the invention also results in additonal benefits, including decreased alkali requirement for neutralization of condenser sump, cleaner condenser spray water with consequent decreased condenser spray blockages, improved quality of phosphorus products, increased pumpability of mud, improved plant working conditions, and significant capital and operating cost savings.

DESCRIPTION OF PREFERRED EMBODIMENT

In the process of the present invention, the furnace off-gases leaving the furnace have a temperature below about 300° C., the gases are maintained under a mild positive pressure in the duct from the furnace to the condensers with a low pressure drop occurring between the furnace and the condensers and condensation of phosphorus occurring in the duct is effected in the substantial absence of water.

In the present invention, the duct joining the furnace and the condensers and along which the gaseous products of the furnace are conducted preferably includes a first short vertically rising section which connects at its upper end to the upper end of a long downwardly-directed section leading to the condensers. The slope of the long duct section to the horizontal is such that phosphorus condensed in the duct as the gaseous products cool below the dew point of phosphorus during their passage to the condensers readily flows as a liquid down the inner duct walls into the first condenser, so that a build up of liquid phosphorus in the duct is avoided. In addition, the flow of liquid phosphorus along the inner duct walls helps to maintain the duct free from blockages which may result from dust accumulation in the duct.

The temperature of the gaseous products of the furnace, as measured at the entry to the connecting duct system, is maintained in the range of about 200° to about 300° C., preferably about 200° to about 250° C. The furnace off-take temperatures may be consistently controlled to be within this range by a variety of furnace operating techniques, including the number and location of furnace raw material feed chutes, the quality of the feed material, the depth of the bed of reactants and the frequency of slag tapping.

One of the preferred techniques which is adopted in the process of the invention to achieve the desired temperature control, is to control the quality of raw material feeds, that is, the feeds of phosphate rock, coke and silica, by controlling the size and moisture content of the particles of raw material fed to the furnace.

The size requirement for the phosphate rock feed in this embodiment is such that not more than about 6% by weight of it may pass through an 8 U.S. Standard mesh screen. Usually, the raw phosphate rock first is ground to fines by any convenient method and then agglomerated by any of the well-known agglomeration techniques, such as, briquetting, pelletizing or nodulizing. The agglomerates so produced are screened for feeding to the furnace, and generally are formed with a strength sufficient to withstand handling and conveying after screening to avoid break-down to smaller particle sizes.

The size requirement for the other two raw materials, that is, coke and silica, in this embodiment is such that not more than about 6% by weight of either material may pass through a 6 U.S. Standard mesh screen, and the raw materials are screened on suitable equipment to the above specification prior to feed to the furnace.

The raw materials are fed dry to the furnace and the moisture content of all three raw materials charged to the furnace in this embodiment is maintained below about 2% by weight, to ensure consistency of off-gas temperature, which would not be the case at higher moisture levels.

The pressure of the gas in the duct connecting the furnace with the condensers is always maintained mildly positive relative to the ambient atmosphere, so as to ensure that at no time is there a leakage of air into the duct to cause combustion of phosphorus therein, and the resulting difficulties noted above with respect to air ingress into the precipitators are avoided.

The gaseous products of the furnace generally exert a maximum positive pressure of about ¾ inch of water and usually about ¼ inch of water. This positive pressure may be allowed to decrease to atmospheric pressure at the condensers and in this way the positive pressure is exerted along the length of the duct.

The temperature profile of the wall of the duct leading from the furnace to the condensers may be monitored by any convenient means, such as, for example, by an infrared temperature scanner in order to detect possible dust build ups. The temperature at the outer surface of the duct in areas of internal dust build-up is appreciably lower than in the free sections of the duct, and can, therefore, be detected by the temperature scanner. A number of spray nozzles may be installed in the duct through which water jets may be directed at the dust blockages in order to free the plugged or partially plugged areas by flushing into the condenser sumps.

The water jet removal of dust is effected only for short periods at infrequent intervals and may be effected without shutting down the furnace.

Other than for such intermittent short period spray introduction of water to the duct, the introduction of external water to the duct is avoided, leading to decreased mud formation.

The process parameters utilized in this invention permit the elimination of the prior art precipitator and its attendant problems, while unexpectedly leading to decreased mud formation and other benefits, as outlined above.

The invention is illustrated by the following example:

EXAMPLE

A phosphorus furnace was run for a continuous period with a continuous duct joining the furnace and the precipitators. The duct had an initial short upward section from the furnace and a long downward section to the condensers. During the period of operation, the average off-gas temperature from the furnace was about 200° to about 250° C., the gaseous products exerted a pressure of about ¼ inch of water at entry to the duct and the positive pressure decreased to about 0 at the condensers. During the period of operation, no water or air was admitted to the duct.

The results obtained from this operation were compared with those obtained when an electrostatic precipitator was used in conjunction with the furnace and condensers, the precipitator operating under a vacuum of about 4 to 6 inches of water and an average temperature of about 350° to about 400° C.

The results obtained are reproduced in the following Table:

TABLE

| Property | Conventional Procedure with Precipitator | Operation with no Precipitator |
| --- | --- | --- |
| Mud formation | 15 tons/100 tons P$_4$ | 5.6 tons/100 tons P$_4$ |
| Phosphorus loss to mud | 3.4 wt.% input phosphorus | 1.3 wt.% input phosphorus |
| Overall phosphorus efficiency | 75% | 85% |
| Ammonia usage for neutralization | 43 lb/ton of phosphorus | 11.9 lb/ton of phosphorus* |
| Quality of phosphorus make | 99.7% | 99.8% with improved colour* |

*These results were obtained during an initial phase of the continuous period.

In addition, the condenser spray water was found to be much cleaner when the precipitator was omitted and blockages decreased by 75%. The mud had a better settling quality when the precipitator was omitted, making it easier to pump.

The elimination of the precipitator also eliminated the generally unsafe working conditions which existed with the conventional operation, in that no fumes or fires were experienced during the test period.

SUMMARY

The present invention, therefore, constitutes considerable improvement over the prior art of phosphorus furnace operation by providing a more economical process with decreased generation of mud, generally decreased phosphorus losses and decreased operating costs, coupled with improved and safer working conditions. Modifications are possible within the scope of the invention.

I claim:

1. A process for the production of phosphorus by the electrothermal method in an electrothermal phosphorus furnace, which comprises providing a reactants charge to the furnace having less than about 2% by weight moisture and comprising agglomerated phosphate rock sized such that not more than about 6% by weight thereof passes through an 8 mesh screen, and coke and silica particles sized such that not more than about 6% by weight thereof passes through a 6 mesh screen, forming gaseous products in said furnace consisting essentially of phosphorus vapour, carbon dioxide gas and associated dust having a temperature of about 200° C. to less than 300° C. at the gaseous outlet from said furnace, conducting said gaseous products by a single continuous duct directly from the furnace to wet phosphorus condensers in the absence of electrostatic duct precipitating equipment between said furnace and said condensers while maintaining a positive pressure in said duct exerted by said gaseous products which does not exceed about ¾ inch of water at said furnace outlet and which decreases in value along the length of said duct, whereby the ingress of external air to the gaseous products is avoided, said duct including a first short upwardly-extending duct portion from the furnace gaseous outlet and a second long downwardly-extending portion from the upper extremity of said first portion to said condensers, said second duct portion having a sufficiently steep angle to cause phosphorus condensing therein to flow to said condensers, other than may be intermittently required to remove accumulated dust in the duct, avoiding the introduction of water to the duct from external sources, and condensing and recovering phosphorus in said condensers from the gaseous products conveyed thereto by said duct.

2. The process of claim 1 wherein said temperature is about 200° to about 250° C.

3. The process of claim 1 wherein said positive pressure does not exceed about ½ inch of water.

4. The process of claim 1 including sensing the build up of dust accumulations in said duct and dislodging said accumulations by spraying with water.

* * * * *